United States Patent [19]

Taylor et al.

[11] Patent Number: 4,738,634

[45] Date of Patent: Apr. 19, 1988

[54] ELECTRICAL WIRING APPARATUS

[76] Inventors: Richard D. Taylor, P.O. Box 684, Kingston, Okla. 73439; Phillip W. Stumpff, P.O. Box 802, Madill, Okla. 73446

[21] Appl. No.: 939,185

[22] Filed: Dec. 8, 1986

[51] Int. Cl.⁴ .............................. H01R 4/24
[52] U.S. Cl. .................................... 439/441
[58] Field of Search ....................... 339/95 D

[56] References Cited

U.S. PATENT DOCUMENTS

| | | | |
|---|---|---|---|
| Re. 29,513 | 6/1978 | Johnson | 339/112 R |
| 2,671,204 | 3/1954 | Hubbell | 339/95 D |
| 2,705,785 | 4/1955 | Benander | 339/164 |
| 2,725,544 | 11/1955 | Strange | 339/95 |
| 2,738,482 | 3/1956 | Benander | 339/164 |
| 2,743,423 | 4/1956 | Parks | 339/95 D |
| 2,753,538 | 7/1956 | Carlson | 339/164 |
| 2,873,433 | 2/1959 | Despard | 339/95 |
| 2,875,424 | 2/1959 | Hubbell | 339/164 |
| 2,890,436 | 6/1959 | Bentley | 339/258 |
| 3,001,168 | 9/1961 | Smith | 339/95 D |
| 3,097,906 | 7/1963 | Shannon | 339/253 |
| 3,323,099 | 5/1967 | Spera | 339/192 |
| 3,324,447 | 6/1967 | Pistey | 339/95 D |
| 3,339,170 | 8/1967 | Martin | 339/31 |
| 3,393,397 | 7/1968 | Manichl | 339/95 |
| 3,451,037 | 6/1969 | Herrli | 339/192 |
| 3,569,911 | 3/1971 | Bogdanowicz | 339/95 |
| 3,585,570 | 6/1971 | Jans | 339/95 |
| 3,717,840 | 2/1973 | Vaughan et al. | 339/198 R |
| 3,828,113 | 8/1974 | Bourne | 174/55 |
| 3,863,037 | 1/1975 | Schindler et al. | 174/58 |
| 3,885,852 | 5/1975 | Grove | 339/95 D |
| 3,916,149 | 10/1975 | Skinner | 219/335 |
| 3,922,478 | 11/1975 | Perkey | 174/53 |
| 3,936,126 | 2/1976 | Miller | 339/95 D |
| 3,945,711 | 3/1976 | Hohorst et al. | 339/95 D |
| 4,012,100 | 3/1977 | Viscosi | 339/95 D |
| 4,106,835 | 8/1978 | Kimm | 339/95 D |
| 4,165,443 | 8/1979 | Figart et al. | 174/53 |
| 4,166,934 | 9/1979 | Marrero | 200/51 R |
| 4,210,772 | 7/1980 | Magana et al. | 174/59 |
| 4,295,018 | 10/1981 | Borrelli | 200/51.09 |
| 4,336,418 | 6/1982 | Hoag | 174/53 |
| 4,420,215 | 12/1983 | Tengler | 339/176 R |

Primary Examiner—Joseph H. McGlynn
Attorney, Agent, or Firm—Laney, Dougherty, Hessin & Beavers

[57] ABSTRACT

A plug-in type electrical wiring apparatus having electrical contact strips held in place by electrically conducting terminals. The apparatus includes upper and lower housing portions forming a housing enclosing the electrical contact strips. Each electrical contact strip has a pair of legs interconnected at one end by a longitudinal web. The web has wire receiving openings therebetween, such that a wire inserted through any opening is engagingly received between the legs. In an alternate embodiment, a shoulder extends from one of the legs and provides additional electrical contact for the wire. Cable receiving sockets are located in the housing in registry with the web openings. A plurality of electrically conductive terminals are positioned on an opposite side of the lower housing portion from the electrical contact strips. Each terminal has a member extending into the housing and engagingly received between the legs of a contact strip. Transverse slots in the arcuate leg portion allow compensation for differences in sizes between the member and wires. One contact strips has a key extending therefrom which is received in a key receiving aperture in another strip such that relative movement between the contact strips is prevented.

40 Claims, 5 Drawing Sheets

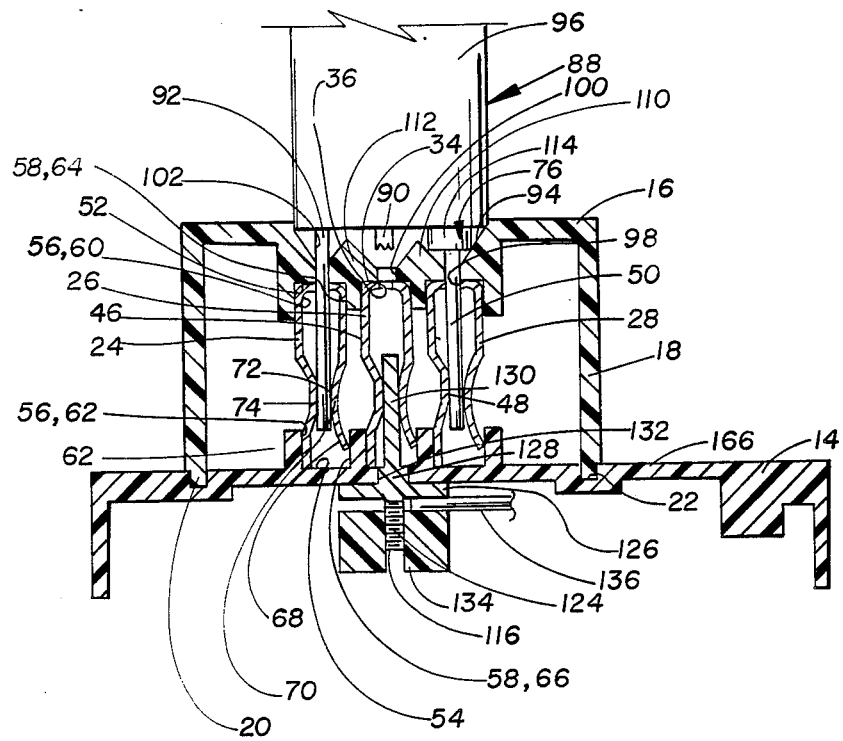
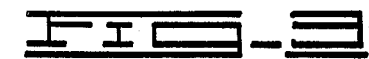
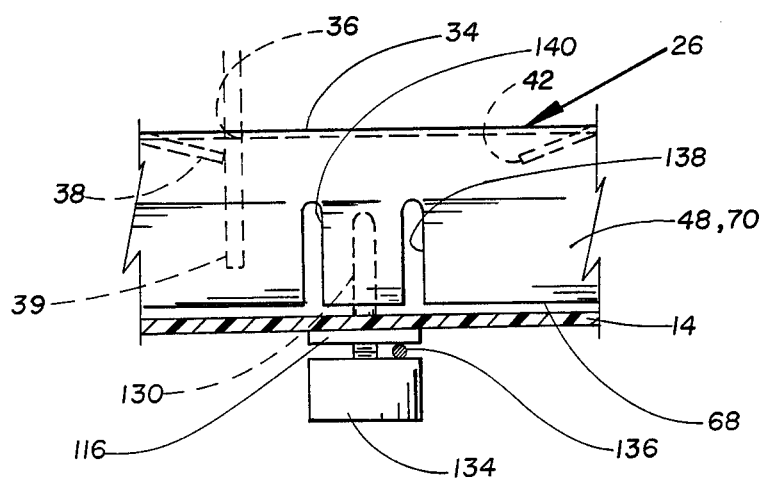
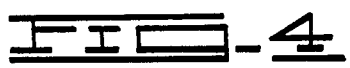

ELECTRICAL WIRING APPARATUS

BACKGROUND OF THE INVENTION

1. Field Of The Invention

This invention relates to plug-in type electrical wiring apparatus for use in constructing the wiring system of a house or other building, and more particularly, to a wiring apparatus having an electrical contact strip held in place by an electrically conducting terminal.

2. Description Of The Prior Art

When a new building is being wired or an older building is being rewired, considerable time must be spent in making electrical connections within conventional junction, switch and receptacle boxes, and considerable time must also be spent in mounting such boxes. Accordingly, a need exists for an electrical connection box with which various two- and three-wire conductors may be quickly electrically connected in order to provide the electrical circuitry, and which may be quickly mounted from joists and studs.

The prior art includes wiring systems having plug-in type connections, such as seen in U.S. Pat. No. 4,165,443 to Figart et al.

Also, the prior art has included outlet boxes having offset flanges for mounting of the box on studs with the face of the box extending from the stud a distance equal to the thickness of the wall board to be used with the device, as seen in U.S. Pat. No. 3,863,037 to Schindler et al.

Other examples of various forms of electrical connection apparatus, including plug-in type connectors, and in some instances some of the other general structural and operational features of the present invention, include U.S. Pat. Nos. 3,885,852; 3,339,170; 3,393,397; 3,451,037; 3,569,911; 3,717,840; 3,828,113; 4,012,100; and 4,106,835.

In spite of the numerous attempts which have been made to develop a practical alternative to conventional junction, switch and receptacle boxes, some of which attempts are shown by the above-cited references, none of these attempts has succeeded in providing a system which has found widespread acceptance in the marketplace. There is still the need for much improvement in plug-in type systems, and the present invention addresses such needs.

Further, there is a need for an electrical wiring apparatus which utilizes easily manufactured parts and facilitates assembly thereof. The improvements in the present invention provide an electrical wiring apparatus which includes conventionally manufactured parts and one which is quickly assembled.

SUMMARY OF THE INVENTION

The electrical wiring apparatus of the present invention comprises an insulating member or block, an electrical contact strip disposed on a first side of the insulating member, and an electrically conducting terminal. The contact strip comprises a pair of leg portions interconnected at a first end thereof by a middle web portion, and the leg portions are spaced apart at a second end thereof adjacent the insulating member. The electrically conducting terminal comprises conductor engaging means disposed on a second side of the insulating member opposite the first side for engaging an electrical conductor, and strip engaging means extending from the conductor engaging means and through the insulating member for retainingly engaging the leg portions of the contact strip.

Preferably, the strip engaging means comprises an elongated member engagingly received between the leg portions by springingly separating the leg portions.

The insulating member defines a groove therealong and the second ends of the leg portions are disposed in the groove, and in one embodiment the elongated member is characterized by a post which forces at least a portion of the leg portions apart for lockingly bearing on corresponding sides of the groove.

In an alternate embodiment, each of the leg portions includes a clamping portion thereon which are disposed opposite one another, and the elongated member is engagingly received between the clamping portions. Preferably, the clamping portions are substantially flat areas formed in each of the leg portions, and the elongated member is characterized by a substantially flat blade which is flatly gripped by the clamping portions.

The middle web portion defines a wire receiving web opening therethrough and includes retaining means for engaging a wire when the wire is inserted in the web opening and for resisting withdrawal of the wire from the web opening. The leg portions of the electrical contact strip are adapted to engagingly receive the wire therebetween.

The elongated member on the terminal and the wire are longitudinally spaced apart along the electrical contact strip, and the strip preferably defines a transverse slot in at least one leg portion thereof at a point longitudinally between the elongated member and the wire. In this way, the parts of the leg portions which receive the wire and elongated member may deflect separately to compensate for differences in the thickness of the wire and elongated member or for variations in thickness of different wires.

In an alternate embodiment, the apparatus of the present invention further comprises shoulder means disposed between said leg portions and adjacent said retaining means for engaging said wire and providing electrical contact therewith. The shoulder means is preferably characterized by a shoulder which is stamped from one of the first and second leg portions and which extends substantially perpendicularly therefrom toward the other of the first and second leg portions. The shoulder is also substantially perpendicular to the middle web portion.

In a preferred embodiment illustrated as an electrical junction box, the insulating member forms a lower housing portion, and the apparatus further comprises an insulating upper housing portion. The lower and upper housing portions are engageable for mutually forming a housing enclosing the electrical contact strip. The housing defines a wire receiving housing opening therein in registry with the web opening. In this embodiment, the web opening is one of a plurality of aligned web openings disposed through the web portion, and the housing opening is one of a plurality of aligned housing openings disposed through the upper housing portion, each one of the housing openings being in registry with one of the web openings.

One of the leg portions is arcuate in cross section with a convex side thereof facing the other leg portion, and the other leg portion has a planar part adjacent an offset toward the arcuate part of the one leg portion. When engaged with a wire, the wire is engagingly gripped between the convex side of the arcuate part of the one leg portion and the planar part of the other leg portion with the one leg portion resiliently biased against the wire. In the embodiment having a post for the elongated member of the strip engaging means, the post is similarly engaged.

The conductor engaging means comprises a radially outer flange and conductor retaining means for retaining the conductor in engagement, and electrical communication, with the flange. The conductor engaging means preferably comprises a threaded stud extending from the flange and a nut threadingly engaged with the stud and is used to clamp the electrical conductor between the flange and nut.

The electrical contact strip is preferably a first of a plurality of such electrical contact strips, including a second contact strip. One of the first and second contact strips comprises key means thereon, and the other of the first and second contact strips comprises key receiving means thereon for engagingly receiving the key means.

In a first embodiment, the key means is characterized by a key portion extending longitudinally from the leg portions of the one electrical contact strip such that at least a portion of this longitudinal extension is arcuate in cross section. In this way, the key portion comprises a narrow portion and an enlarged portion. The key receiving means is best characterized by a key receiving aperture in a leg of the other contact strip, the aperture being dimensioned to conform to the key portion.

In an alternate embodiment, the key means is characterized by a blade extending substantially perpendicular from one of the leg portions of the one electrical contact strip. The key receiving means is best characterized by a key receiving aperture defined between clamping portions formed on the first and second legs of the other contact strip. The clamping portions are preferably flat, and thus flatly grip the blade of the key portion therebetween.

When so engaged in either embodiment, relative movement of the first and second contact strips in at least a direction normal to the insulating member is prevented. In the preferred embodiment, the first and second contact strips are disposed perpendicular to one another.

An important object of the present invention is to provide an electrical wiring apparatus which utilizes an electrical contact strip physically held in place by, and maintained in electrical communication with, an electrically conducting terminal.

Another object of the invention is to provide an electrical wiring apparatus having a pair of electrical contact strips keyed together so that relative movement therebetween is prevented.

A further object of the present invention is to provide an electrical wiring apparatus which is easily assembled and installed.

Still another object of the invention is to provide an electrical wiring apparatus with electrical contact strips having shoulder means therein for engaging and providing electrical contact with a wire connected to said electrical contact strip.

Other objects and advantages of the invention will become apparent to those skilled in the art when the following detailed description of the preferred embodiment is read in conjunction with the drawings which illustrate such preferred embodiment.

BRIEF DESCRIPTION OF THE DRAWINGS

FIG. 3 is a cross section of the apparatus taken along lines 3—3 in FIG. 1.

FIG. 4 is a fragmentary cross-sectional view taken along lines 4—4 in FIG. 2.

DETAILED DESCRIPTION OF THE PREFERRED EMBODIMENT

Figure 1:
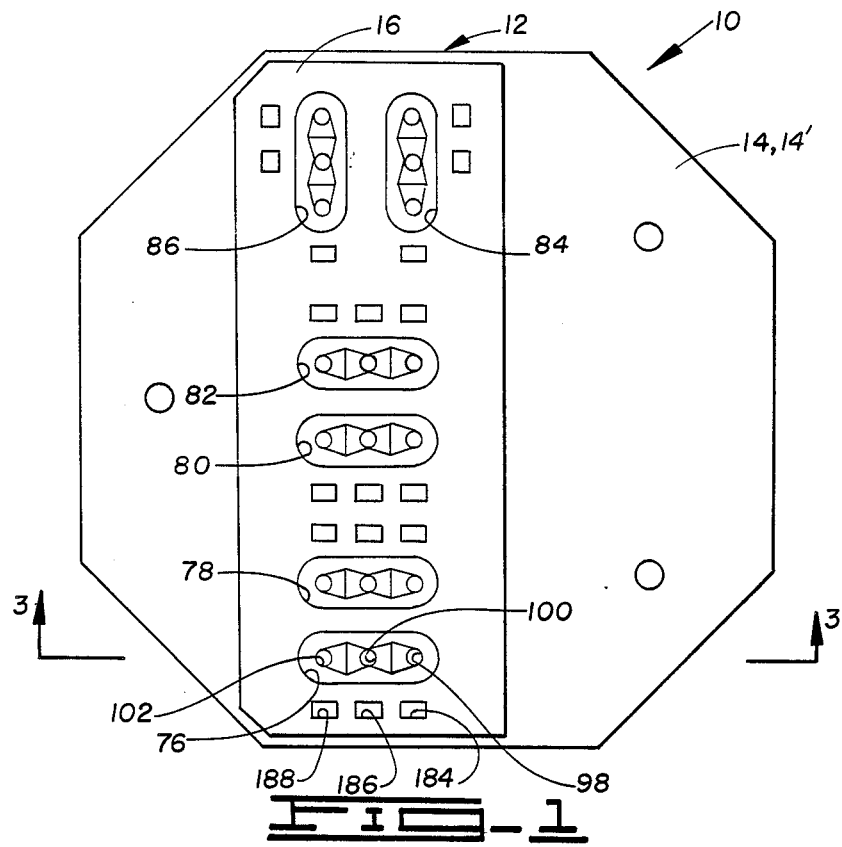
FIG. 1 is a plan view of the electrical wiring apparatus of the present invention.
Figure 2:
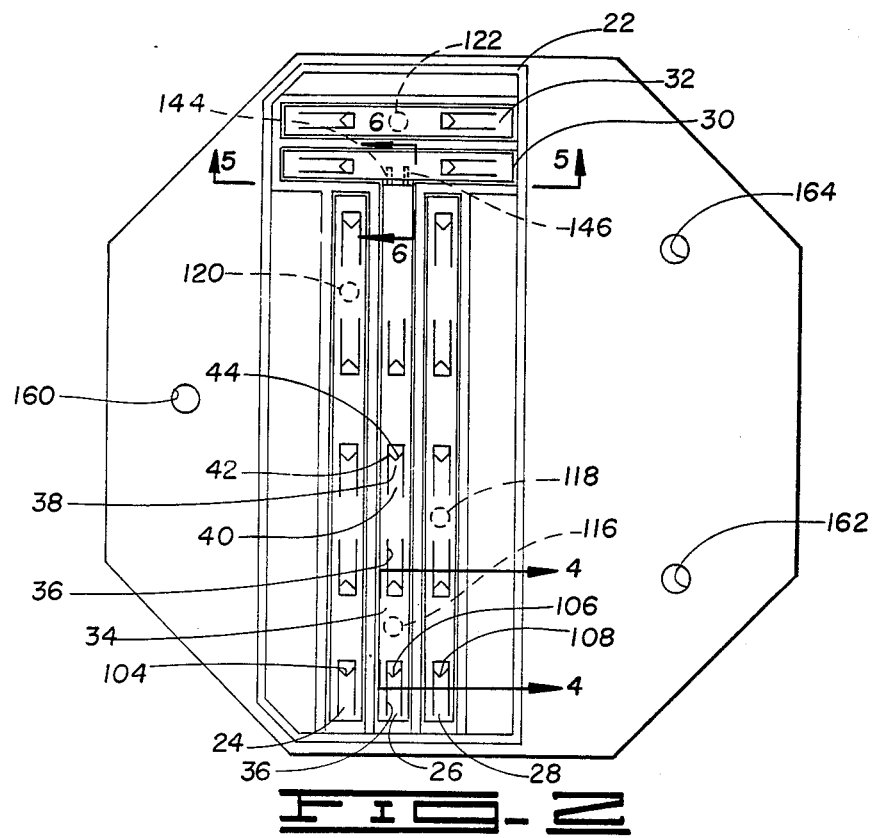
FIG. 2 is a plan view of the apparatus with an upper housing portion removed.

Referring now to the drawings, and particularly to FIG. 1, a first embodiment of the electrical wiring apparatus of the present invention is generally shown as an electrical junction box designated by the numeral 10. Apparatus 10 includes an outer housing 12 formed by a lower housing portion 14 and an upper housing portion 16. Referring also to FIGS. 2 and 3, upper housing portion 16 has an outer wall 18 with a narrow lower lip 20 thereon which is received in groove 22 of lower housing portion 14.

Disposed in housing 12 are five electrical contact strips 24, 26, 28, 30 and 32. Strip 24 is referred to as a common contact strip 24. Strip 26 is referred to as a ground contact strip 26. Strip 28 is referred to as a power contact strip 28. Strip 30 is referred to as a ground extension contact strip 30. Strip 32 is referred to as a switched power strip 32. As shown in FIG. 2, strips 24, 26 and 28 are elongated and parallel to one another. Strips 30 and 32 are also elongated, but are somewhat shorter than strips 24, 26 and 28. Strips 30 and 32 are oriented parallel to one another and perpendicular to strips 24, 26 and 28. The orientation and wiring of these strips is substantially the same as one of the embodiments shown in co-pending U.S. patent application Ser. No. 671,129, filed Nov. 13, 1984, which is incorporated herein by reference.

Each of strips 24, 26, 28, 30 and 32 are similarly constructed, and the general construction of any one of the strips will be described with particular reference to ground contact strip 26. Strip 26 has a first end which includes a middle elongated web portion 34 having wire receiving web openings 36 disposed therethrough. Referring also to FIG. 4, each web opening 36 is formed by punching a resilient tab 38 from web 34. Tab 38 may further be described as a wire retaining means for engaging and retaining a wire 39 inserted through web opening 36 and for resisting withdrawal of such a wire from the web opening as further described herein.

Each of the resilient tabs 38 has a fixed end 40 integrally attached to web portion 34 and a free end 42. Free ends 42 are deflected downwardly from web portion 34. Free ends 42 of the resilient tabs 38 have V-notches 44 disposed therein for engaging wire 39.

Contact strip 26 further includes first and second elongated leg portions 46 and 48 extending downwardly from web portion 34 toward lower housing portion 14. First and second leg portions 46 and 48 of each contact strip are arranged to engagingly receive a wire therebetween. As shown in FIG. 3, such a wire 50 is engaged with power contact strip 28.

Referring to FIGS. 2 and 3, it is seen that each of strips 24, 26, 28, 30 and 32 is disposed in a groove of housing 12. With particular reference to strip 24, strip 24 is disposed in a groove defined by an upper first wall 52 on upper housing portion 16, a lower second wall 54 on lower housing portion 14 opposite first wall 52, and opposed third and fourth walls 56 and 58 extending at least partially between first and second walls 52 and 54. Third wall 56 has first and second separate portions 60 and 62, integrally formed on upper and lower housing sections 16 and 14, respectively. Similarly, fourth wall 58 has first and second separate portions 64 and 66, integrally formed on upper and lower housing portions 16 and 14, respectively.

Web portion 34 of common contact strip 24 engages upper first wall 52, and the lower end of first leg portion 46 of common contact strip 24 engages lower wall 54.

Second leg portion 48 of common contact strip 24, however, has a lower free end 68 which engages lower second wall portion 66 of fourth wall 58 and which is spaced above lower second wall 54.

Second leg portion 48 is flexible leg portion and is constructed so that it is flexed upon insertion of a wire between first and second leg portions 46 and 48. As the second leg portion 48 is flexed upon insertion of a wire, such as wire 50, between leg portions 46 and 48, lower free end 68 thereof slides downwardly along lower second portion 66 of fourth wall 58 toward lower second wall 54.

A lower portion 70 of second leg portion 58 is arcuate in cross section and has a convex side 72 facing first leg portion 46. First leg portion 76 has a planar part 74 which is adjacent and offset toward arcuate portion 70 of second leg portion 48.

When a wire is inserted between first and second leg portions 46 and 48, it is engagingly gripped between convex side 72 of arcuate portion 70 of second leg portion 48 and planar part 74 of first leg portion 46. As noted above, such a wire 50 is illustrated in FIG. 3 as engaged with power contact strip 28.

As wire is inserted between first and second leg portions 46 and 48, first leg portion 46 remains relatively fixed, since its lower end engages the lower second wall 54, and the arcuate cross-sectional portion 70 of second leg portion 48 flexes by flattening the arc thereof. This causes second leg portion 48 to be resiliently biased against wire 50 so that it pushes against the wire and accordingly pushes the wire against planar part 74 of first leg portion 46.

Due to the large flat area of planar part 74, a large area of electrical contact is provided between wire 50 and first leg portion 46.

Referring again to FIG. 1, upper housing portion 16 has six cable-receiving external sockets 76, 78, 80, 82, 84 and 86, each of which is identical in construction. Socket 76 is shown in partial cross section in FIG. 3, and the following description is applicable to each of the sockets.

Each of sockets 76, 78, 80, 82, 84 and 86 is constructed for use with a cable 88. Cable 88 is a three-wire conductor having wire 50, already discussed, and wires 90 and 92.

Socket 76 is defined by a side wall 94 which is convergingly tapered toward the bottom of the socket. Tapered side wall 94 wedgingly engages outer casing 96 of cable 88. At the bottom of socket 76 are first, second and third aligned housing openings 98, 100 and 102, respectively, disposed therethrough. Housing openings 98, 100 and 102 are in registry with V-notch 104 of common contact strip 24, V-notch 106 of ground contact strip 26, and V-notch 108 of power contact strip 28, respectively, as shown in FIG. 2. Similarly, the three housing openings in each of the other sockets 78, 80, 82, 84 and 86 are in registry with V-notches in the corresponding contact strips located therebelow, which can readily be determined by a comparison of FIGS. 1 and 2.

Socket 76 further includes first and second tapered mid-walls 110 and 112, respectively. The tapered walls in socket 76 are thus also adapted to receive an inner insulating sheath, such as 114 which is shown wedgingly engaged with tapered mid-wall 110 and tapered side wall 94. Although only one inner insulating sheath 114 is illustrated in FIG. 3, it will be obvious that each of openings 98, 100 and 102 have adjacent tapered walls for wedging engagement with such an insulating sheath.

When cable 88 is inserted into socket 76, it is very snugly held therein through a combination of the already described resilient gripping action of strips 24, 26 and 28 on wires 92, 90 and 50, respectively, in combination with the wedging action of casing 96 within tapered side wall 94, and the wedging action of the inner sheaths, such as sheath 114, between the other tapered walls.

Figure 7:
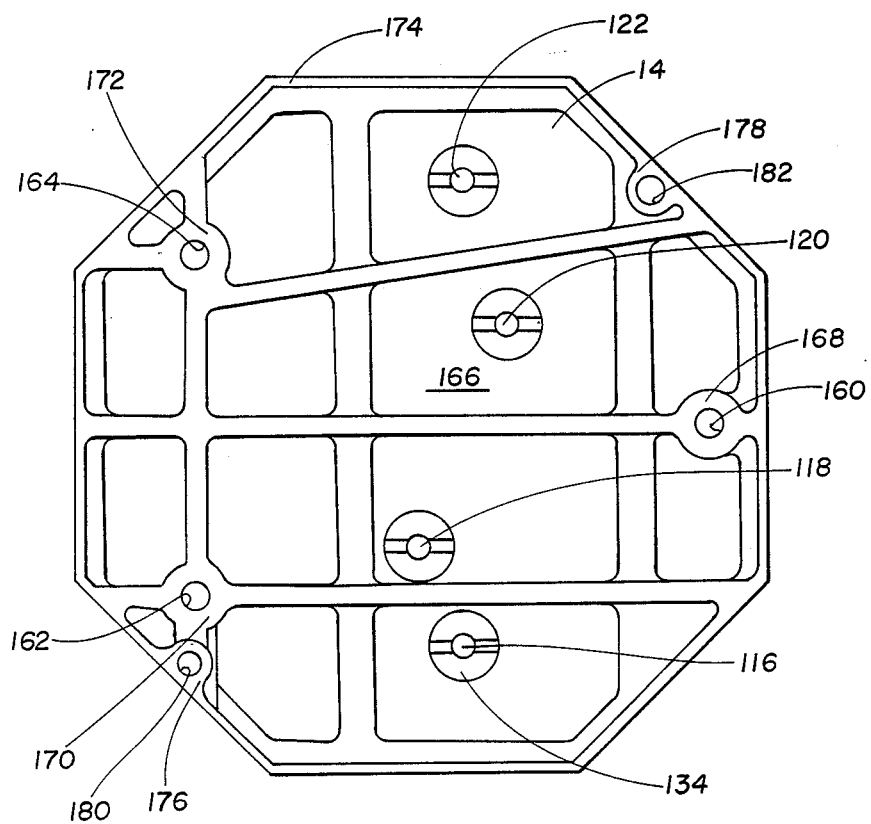
FIG. 7 is a bottom view of the apparatus.

Referring now to FIG. 7, positioned on an opposite side of lower housing portion 14 from electrical contact strips 24, 26, 28, 30 and 32 are four electrically conductive terminals 116, 118, 120 and 122.

Each of terminals 116, 118, 120 and 122 is identical in construction. Terminal 116 is shown in FIG. 3, and the following description of terminal 116 is applicable to each of the other terminals 118, 120 and 122. Terminal 116 has a first end with a threaded stud 124 extending downwardly and away from a radially outwardly directed flange 126. Flange 126 is adjacent lower housing portion 14.

On the opposite side of flange 126 from stud 124 is a second end with an intermediate shoulder portion 128 with an upwardly extending elongated member in the form of a post 130. Intermediate shoulder portion 128 is adapted to extend through, and closely fit within, opening 132 in lower housing portion 14. This may be a press fit, or alternatively, terminal 116 may be cemented in place so that the terminal is fixedly attached to lower housing portion 14.

Post 130 of terminal 116 extends between planar part 74 of first leg portion 46 and arcuate portion 70 of second leg portion 48 of contact strip 26. Post 130 of terminal 116 is thus gripped between first and second leg portions 46 and 48 which forces the leg portions to lockingly bear against corresponding sides of the groove in lower housing portion 14. This acts to hold contact strip 26 in place, and thus a retaining means is provided for retaining strip 26 in relationship to lower housing portion 14. Terminal 116 is electrically conductive so that flange portion 126 of terminal 116 is thereby in electrical communication with contact strip 26.

Similarly, terminals 118, 120 and 122 engage, retain, and provide electrical contact with, contact strips 28, 24 and 32, respectively, as will be clear from a comparison of FIGS. 2 and 7. No terminal is engaged with contact strip 30.

A nut 134 is threadingly engaged with stud 124. An electrical conductor 136 may be placed between nut 134 and flange 126, and the nut tightened to clamp the conductor therebetween. Thus, electrical communication is provided between conductor 136 and flange 126, and therefore between conductor 136 and contact strip 26. Nut 134 need not itself be electrically conductive.

Referring now to FIG. 4, a pair of transverse slots 138 and 140 are defined in second leg portion 48 of contact strip 26. Slots 138 and 140 extend from lower end 68 of second leg portion 48 and stop at approximately the upper end of arcuate portion 70 thereof. Slots 138 and 140 are longitudinally spaced and are disposed on opposite sides of post 130 of terminal 116. It will be seen that slot 140 is therefore longitudinally located between web opening 36, and thus wire 40, and post 130 of terminal 116. Similar slots are provided in second leg portions 48 of contact strips 24, 28 and 32 on opposite sides of the posts on terminals 120, 118 and 122, respectively. Further, transverse slots are also positioned in second leg portion 48 of all contact strips between adjacent web openings 36 therein. Slots 138, 140 and the other slots thus divide each arcuate portion 70 of each second leg portion 48 into different sections. These sections between adjacent slots thus may flex separately to compensate for varying thicknesses in wire size and for any difference in the size of post 130 and the wires.

Figure 5:
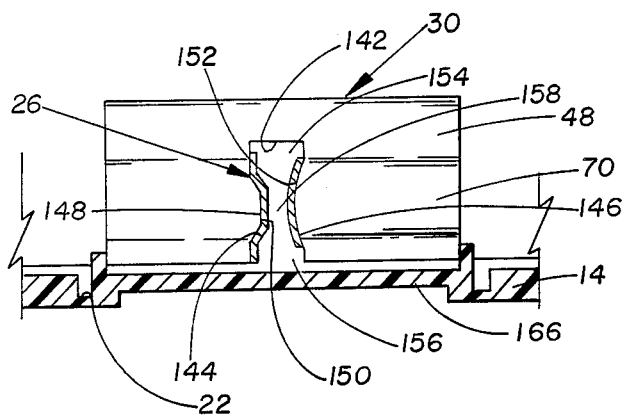
FIG. 5 is a partial cross-sectional view taken along lines 5—5 in FIG. 2.
Figure 6:
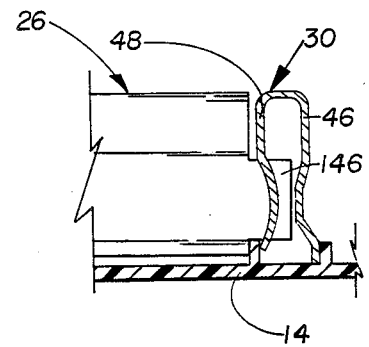
FIG. 6 shows a partial cross-section taken along lines 6—6 in FIG. 2.

Referring now to FIGS. 2, 5 and 6, second leg portion 48 of ground extension strip 30, which is disposed nearer to ground contact strip 26 than first side 46 of strip 30, defines an aperture 142 therein. Extending from first and second leg portions 46 and 48 of contact strip 26 at an end thereof nearest contact strip 30 are a pair of longitudinal extensions 144 and 146, respectively. It will be seen that longitudinal extension 144 includes a planar part 148 which is an extension of planar part 74 of first leg portion 46 of contact strip 26. Similarly, longitudinal extension 146 is of arcuate cross section, being an extension of arcuate portion 70 of second leg portion 48 of contact strip 26.

Aperture 142 includes a flat portion 150 at one side thereof, dimensioned to conform to longitudinal extension 144. On an opposite side of aperture 142 is a convexly curved arcuate portion 152 which faces flat portion 150. Arcuate portion 152 is dimensioned to conform to longitudinal extension 146. Thus, aperture 142 defines an enlarged, relatively wide, upper part 154 and lower part 156, and also a relatively narrow middle part 158 between arcuate portion 152 and flat portion 150.

Extensions 144 and 146 form a key portion of strip 26 which acts as a key means extending into aperture 142 in strip 30. Aperture 142 thus provides a key receiving means. It will be seen that because of the wide upper and lower parts 154 and 156 and narrow middle part 158 of aperture 142, contact strip 30 is maintained in relationship to contact strip 26. In other words, relative movement between contact strips 26 and 30 is prevented when extensions 144 and 146 are positioned in aperture 142.

Narrow portion 158 of aperture 142 is sized such that extensions 144 and 146 are moved relatively closer together when they are engaged in the aperture. Extensions 144 and 146 thus springingly bear against flat portion 150 and arcuate portion 152 of aperture 142, respectively, and thus electrical contact is maintained between contact strips 26 and 30.

Because contact strip 26 is held in place by terminal 116, contact strip 30, being keyed to contact strip 26 as above described, is also maintained in fixed relationship to lower housing portion 14.

As seen in FIGS. 1, 2 and 7, lower housing portion 14 has attachment holes 160, 162 and 164 disposed therethrough which may be used to mount apparatus 10 to any convenient structural member, such as a ceiling beam.

In the bottom view of FIG. 7, it will be seen that lower housing portion 14 includes various reinforcing ribs which support upper wall 166 thereof. Also, there are cylindrical reinforcing sections 168, 170 and 172, associated with attachment holes 160, 162 and 164, respectively.

An octagonally shaped side wall 174 extends around and downward from the perimeter of upper wall 166 of lower housing portion 14.

Additionally, built-up sections 176 and 178 have screw receiving holes 180 and 182 therein, respectively, for attaching a metal support plate, such as used for a hanging lamp, to lower housing portion 14.

Referring once again to FIG. 1, each housing opening, such as 98, 100 and 102, has associated therewith a square opening such as 184, 186 and 188, respectively. Square openings 184, 186 and 188 extend through upper housing portion 16 and provide access for a tool to engage adjacent resilient tabs 38 near their fixed ends 40, so that the resilient tabs may be deflected downwardly to release the respective wires received through openings 98, 100 and 102.

Referring now to FIGS. 8–12, alternate embodiments of the electical wiring apparatus of the present invention are shown. In the alternate embodiments, the plan view shown in FIG. 1 is identical to the first embodiment. Other components and features which are unchanged are indicated in FIGS. 8–12 by the same reference numerals as previously described herein.

Figures 8, 9:
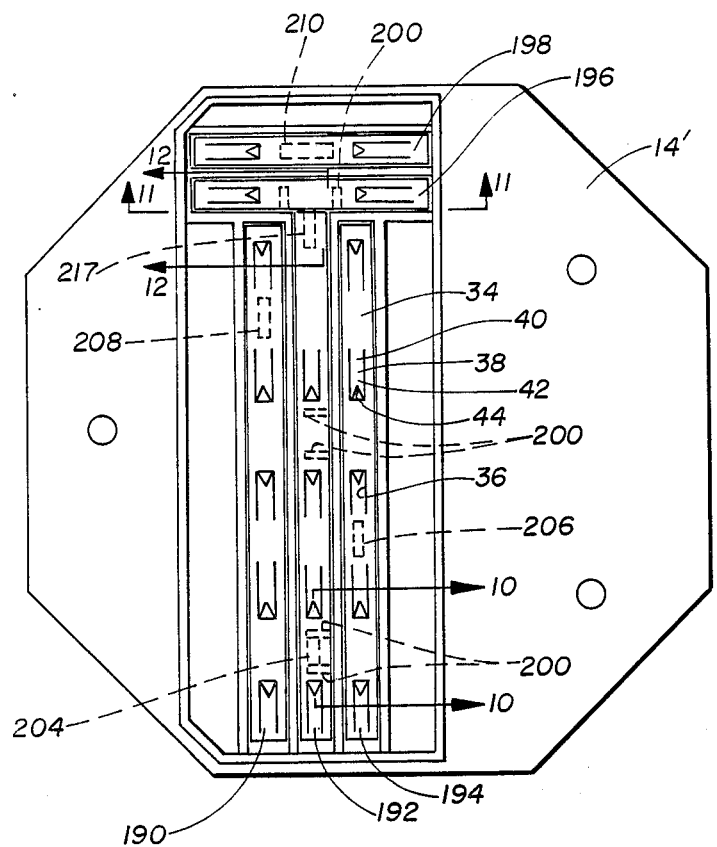
FIG. 8 is a plan view of an alternate embodiment of the apparatus with the upper housing portion removed.
FIG. 9 is a cross section of the alternate embodiment of the apparatus taken along line 3—3 in FIG. 1.

In the alternate embodiment, five electrical contact strips 190, 192, 194, 196 and 198 are disposed in housing 12, in a manner similar to strips 24, 26, 28, 30 and 32 in the first embodiment. Strip 190 is referred to as a common contact strip 190. Strip 192 is referred to as a ground contact strip 192. Strip 194 is referred to as a power contact strip 194. Strip 196 is referred to as a ground extension contact strip 196. Strip 198 is referred to as a switched power strip 198. As shown in FIG. 8, strips 190, 192 and 194 are elongated and parallel to one another. Strips 196 and 198 are also elongated, but are somewhat shorter than strips 190, 192 and 194. Strips 196 and 198 are oriented parallel to one another and perpendicular to strips 190, 192 and 194.

Figure 10:
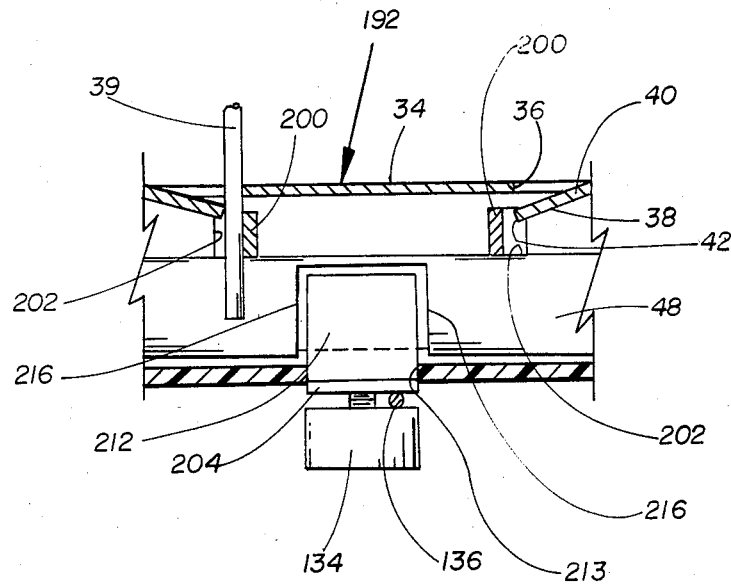
FIG. 10 is a fragmentary cross-sectional view taken along lines 10—10 in FIG. 8.

Each of strips 190, 192, 194, 196 and 198 are similarly constructed, and the general construction of any one of the strips will be described with particular reference to the ground contact strip 192. Just as in the first embodiment, strip 192 has a first end which includes a middle web portion 34 having wire receiving web openings 36 disposed therethrough. As best shown in FIGS. 8 and 10, each web opening 36 is formed by punching a resilient tab 38 from web 34.

Each of the resilient tabs 38 has a fixed end 40 and a free end 42 with a V-shaped notch 44 disposed therein.

Referring also to FIG. 9, contact strip 192 further includes first and second elongated leg portions 46 and 48 extending downwardly from web portion 34 toward lower housing portion 14, arranged to engagingly receive a wire therebetween.

As will be seen, the construction of contact strips 190, 192, 194, 196 and 198 is almost identical to that of previously described contact strips 24, 26, 28, 30 and 32. One distribution between the contact strip of the alternate embodiment and that of the first embodiment is that the strips of the alternate embodiment include a plurality of inwardly directed shoulders 200 which extend substantially perpendicularly inwardly from one of first or second leg portions 46 or 48. As illustrated herein, shoulders 200 extend from second leg portion 48, but it will be seen that shoulders 200 could extend equally well from first leg portion 46. Shoulders 200 are illustrated only on contact strips 192 and 196 in FIG. 8, but it should be understood that similar shoulders are also present on contact strips 190, 194 and 198.

Referring now to FIG. 10, each shoulder 200 is formed by punching the shoulder from the flat upper portion of second leg portion 48. In this way, a window 202 is formed in second leg portion 48. Window 202 has not function other than being a result of the formation of shoulder 200. Each shoulder 200 is spaced from, and generally faces, free end 42 of each tab 38 in all of the contact strips. Tab 38 may be further described as a wire retaining means for engaging and retaining a wire 39 inserted through web opening 36. Tab 38 acts to resist withdrawal of the wire from web opening 36 as already described herein. Shoulder 200 provides a means for an increased area of electrical contact between the wire and the contact strip compared to the first embodiment.

Referring still to FIGS. 9 and 10, an alternate construction for an electrically conductive terminal 204 is shown. Terminal 204 corresponds to ground contact strip 192. Terminal 204 is also indicated in FIG. 8 as are terminals 206, 208 and 210 which correspond to strips 194, 190 and 198, respectively.

Each of terminals 204, 206, 208 and 210 is identical in construction, so the following description of terminal 204 is applicable to each of the other terminals 206, 208 and 210. Terminal 204 has a first end with a threaded stud 124 extending downwardly and away from a radially outwardly directed flange 126. It will be seen that threaded stud 124 and flange 126 are identical to the stud and flanges on terminals 116, 118, 120 and 122 of the first embodiment.

On the opposite side of flange 126 from stud 124 is a second end with an upwardly extending, elongated member in the form of a substantially flat blade 212. Blade 212 is adapted to extend through, and closely fit within, a slot 213 in lower housing portion 14'. It will be seen that slots 213 in lower housing portion 14' of the alternate embodiment are used instead of openings 132 in lower housing portion 14 of the first embodiment. This is the only difference between lower housing portion 14' and lower housing portion 14. The positioning of blade 212 in slot 213 may be a pres fit, or alternatively, terminal 204 may be cemented in place so that it it fixedly attached to lower housing portion 14'.

Blade 212 of terminal 204 extends between a clamping portion 214 of first leg portion 46 and a facing clamping portion 215 of second leg portion 48 of contact strip 192. Clamping portions 214 and 215 are substantially planar areas stamped from first and second legs 46 and 48, respectively. Clamping portions 214 and 215 define an aperture therebetween and are adapted for flat, gripping contact with blade 212 of terminal 204. As with post 130 of the first embodiment, this engagement of blade 212 with first and second leg portions 46 and 48 acts to hold contact strip 192 in place, and thus a retaining means is provided for retaining strip 192 in relationship to lower housing portion 14'.

Terminal 204 is electrically conductive so that flange portion 126 of terminal 204 is thereby in electrical communication with contact strip 192. Similarly, terminals 206, 208 and 210 engage, retain and provide electrical contact with, contact strips 194, 190 and 198, respectively, as will be clear from a study of FIG. 8. No terminal is engaged with contact strip 196.

It will be seen that blade 212 of terminals 204, 206, 208 and 210 of the alternate embodiment provide increased electrical contact area between leg portions 46 and 48 of the corresponding contact strips compared to post 130 of the terminals of the first embodiment. Also, the width of blade 212 results in an increased locking force for locking the contact strips in position in lower housing portion 14'.

As with the first embodiment, a nut 134 is engaged with stud 124. An electrical conductor 136 may be placed between nut 134 and flange 126, and the nut tightened to clamp the conductor therebetween. Thus, electrical communication is provided between conductor 136 and flange 126, and therefre between conductor 136 and contact strip 192.

The formation of clamping portions 214 and 215 forms a pair of narrow, transverse slots 216 in second leg portion 48 of contact strip 192. Slots 216 allow clamping portions 214 and 215 to flex separately from the rest of first and second leg portions 46 and 48 so that any differences in the size of the wires to be engaged and blades 212 does not affect the gripping action by the contact strip on the wires.

Figure 11:
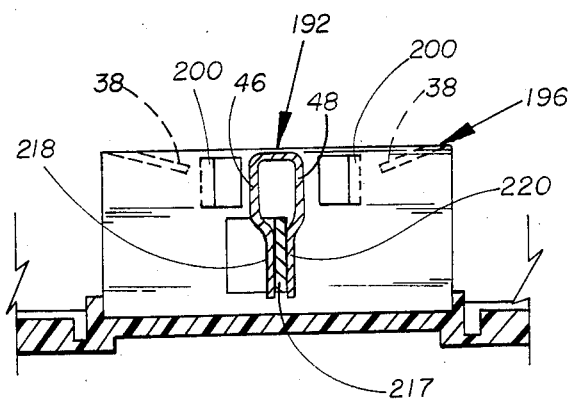
FIG. 11 is a partial cross-sectional view taken along lines 11—11 in FIG. 8.
Figure 12:
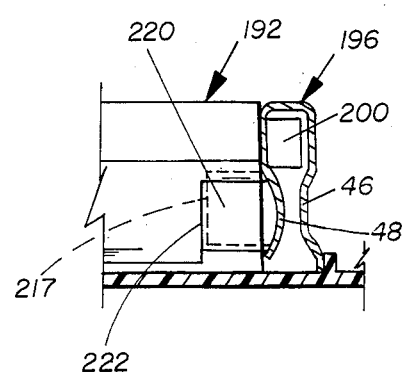
FIG. 12 shows a partial cross section taken along lines 12—12 in FIG. 8.

Referring now to FIGS. 8, 11 and 12, an alternate embodiment of the engagement between ground contact strip 192 and ground extension contact strip 196 is shown. In this alternate embodiment, an engagement plate 217 extends toward contact strip 194 and into an aperture between leg portions 46 and 48 thereof. Adjacent plate 217 a substantially flat clamping portion 218 is stamped from first leg portion 46, and a corresponding flat clamping portion 220 is stamped from second leg portion 48 of ground contact strip 192. Flat clamping portions 218 and 220 are positioned opposite one another and spaced to grippingly receive plate 216 therebetween so that ground extension contact strip 196 is attached to ground contact strip 192. Thus, ground extension contact strip 196 is held physically in place, and electrical contact is provided between contact strips 192 and 196. In this way, plate 217 acts as a key means, and clamping portions 218 and 220 along with the aperture therebetween provide a key receiving means.

Thus, in either the first embodiment or the alternate embodiment, one of the ground contact strip and ground extension contact strip includes a key means, and the other of the contact strips includes a key receiving means.

The formation of clamping portions 218 and 220 forms a transverse narrow slot 222 along one side thereof. Thus, clamping portions 218 and 220 are free to flex separately from the rest of first and second leg portions 46 and 48 of electrical contact strip 192 for compensating for variations in the size of plate 217 and any wires clamped by the electrical contact strip. The configuration of clamping portions 218 and 220 and plate 217 provides greater electrical contact between strips 192 and 196 than was provided between strips 26 and 30 of the first embodiment.

It can be seen, therefore, that the electrical wiring apparatus of the present invention is well adapted to carry out the ends and advantages mentioned, as well as those inherent therein. While preferred embodiments of the invention have been illustrated for the purposes of this disclosure, numerous changes in the arrangement and construction of parts may be made by those skilled in the art, which changes are encompassed within the scope and spirit of the present invention as defined by the appended claims.

What is claimed is:

1. An electrical wiring apparatus comprising:
   an insulating member;
   an electrical contact strip disposed on a first side of said insulating member, said contact strip comprising a pair of leg portions interconnected at a first end thereof by a middle web portion between said leg portions, said leg portions being spaced apart at a second end thereof; and
   an electrically conducting terminal comprising:
      conductor engaging means, disposed on a second side of said insulating member opposite said first side, for engaging an electrical conductor; and
      strip engaging means, extending from said conductor engaging means and through said insulating member, for retainingly engaging a portion of said leg portions of said contact strip.

2. The apparatus of claim 1 wherein:
   said contact strip is a first of a plurality of electrical contact strips;
   one of said first contact strip and a second contact strip comprises key means thereon; and
   the other of said first and second contact strips comprises key receiving means thereon for engagingly receiving said key means.

3. The apparatus of claim 2 wherein said key means engages said key receiving means such that displacement of said second contact strip in a direction normal to said insulating member is prevented.

4. The apparatus of claim 1 wherein said strip engaging means comprises an elongated member engagingly received between said leg portions.

5. The apparatus of claim 4 wherein said elongated member is a post and at least one of said leg portions defines a transverse slot therein adjacent and substantially parallel to said post.

6. The apparatus of claim 5 wherein said insulating member defines a groove portion therealong and said second ends of said leg portions are disposed in said groove portion, said post forcing said leg portions apart for lockingly bearing on corresponding sides of said groove portion.

7. The apparatus of claim 4 wherein:
   each of said leg portions includes a clamping portion thereon, said clamping portions being disposed opposite one another; and
   said elongated member is clamped between said clamping portions.

8. The apparatus of claim 7 wherein said clamping portions are substantially flat areas formed in said leg portions.

9. The apparatus of claim 7 wherein said elongated member is a substantially flat blade and said clamping portions flatly grip said blade.

10. The apparatus of claim 1 wherein:
    said middle web portion defines a wire receiving web opting therethrough and includes retaining means for engaging a wire when said wire is inserted in said web opening and for resisting withdrawal of said wire from said web opening; and
    said leg portions are adapted to engagingly receive said wire therebetween.

11. The apparatus of claim 10 wherein said web opening and said strip engaging means are longitudinally spaced and one of said leg portions defines a transverse slot therein, said slot being longitudinally located between said web opening and said strip engaging means.

12. The apparatus of claim 10 wherein:
    said insulating member forms a lower housing portion; and
    said apparatus further comprises an insulating upper housing portion engageable with said lower housing portion for mutually forming a housing enclosing said electrical contact strip, said housing defining a wire receiving housing opening therein in registry with said web opening.

13. The apparatus of claim 12 wherein:
    said web opening is one of a plurality of aligned web openings disposed through said web portion; and
    said housing opening is one of a plurality of aligned housing openings disposed through said upper housing portion, each one of said housing openings being in registry with one of said web openings.

14. The apparatus of claim 10 wherein at least a part of one leg portion is arcuate in cross section with a convex side thereof facing the other of said leg portions.

15. The apparatus of claim 14 wherein the other of said leg portions has a planar part adjacent and offset toward said arcuate part of said one leg portion, so that said wire is engagingly gripped between said convex side of said arcuate part of said one leg portion and said planar part of said other leg portion with said one leg portion resiliently biased against said wire.

16. The apparatus of claim 10 further comprising shoulder means disposed between said leg portions and adjacent said retaining means for engaging said wire and providing electrical contact therewith.

17. The apparatus of claim 16 wherein said shoulder means is characterized by a shoulder stamped from said one of said first and second leg portions.

18. The apparatus of claim 17 wherein said shoulder extends substantially perpendicular to said middle web portion.

19. The apparatus of claim 1 wherein said conductor engaging means comprises:
    a radially outer flange; and
    conductor retaining means for retaining said conductor in engagement and electrical communication with said flange.

20. The apparatus of claim 19 wherein said conductor engaging means comprises:
    a threaded stud extending from said flange; and
    a nut threadingly engaged with said stud and disposed such that said conductor may be positioned and clamped between said flange and said nut.

21. An electrical wiring apparatus comprising:
    an insulating block;

a first electrical contact strip disposed on a side of said block, said contact strip including key means thereon;

a second electrical contact strip disposed on said side of said block, adjacent said first contact strip and defining key receiving means thereon for engagingly receiving said key means and preventing relative movement of said first and second contact strips; and strip retaining means for engaging said block and at least one of said first and second contact strips for retaining said first and second contact strips in a fixed relationshp with said block.

22. The apparatus of claim 21 wherein engagement between said key means and said key receiving means provides electrical communication between said first and second contact strips.

23. The apparatus of claim 21 further comprising an electrical terminal which comprises:
a first end disposed on an opposite side of said block from said first and second contact strips and adapted for attachment to an electrical conductor; and
a second end, characterizing at least a part of said strip retaining means and extending through said block, and providing electrical communication between said one contact strip and said first end of said electrical terminal.

24. The apparatus of claim 23 wherein said one contact strip defines a transverse slot therein adjacent said second end of said terminal.

25. The apparatus of claim 21 wherein:
said key means is characterized by a key portion extending from said first contact strip; and
said key receiving means is characterized by an aperture defined in said second contact strip and dimensioned to conform to said key portion.

26. The apparatus of claim 23 wherein said first electrical contact strip comprises:
a middle web spaced from said side of said block; and
first and second legs extending from said web toward said side of said block, at least one of said legs having a longitudinal extension thereon forming at least a part of said key portion.

27. The apparatus of claim 26 wherein:
said first leg is at least partially arcuate in cross section with a convex side thereof facing said second leg; and
a portion of said longitudinal extension is also arcuate in cross section.

28. The apparatus of claim 26 wherein said second contact strip is substantially perpendicular to said first contact strip and comprises:
a middle web spaced from said side of said block; and
first and second legs extending from said web toward said side of said block, one of said legs of said second contact strip being closer to said first contact strip than the other leg of said second contact strip, said aperture being defined in said one leg of said second contact strip.

29. The apparatus of claim 25 wherein said second electrical contact strip comprises:
a middle web spaced from said side of said block; and
first and second legs extending from said web toward said side of said block, each of said legs having a clamping portion, said clamping portions defining said aperture therebetween.

30. The apparatus of claim 29 wherein said clamping portions are substantially flat.

31. The apparatus of claim 29 wherein said first contact strip is substantially perpendicular to said second contact strip and comprises:
a middle web spaced from said side of said block;
first and second legs extending from said web toward said side of said block, one of said legs of said first contact strip being closer to said second contact strip than the other leg of said first contact strip; and
a contact plate extending from said one leg of said first contact strip between said clamping portions of said second contact strip.

32. An electrical wiring apparatus comprising:
an insulating housing including an upper housing portion and a lower housing portion;
a plurality of electrical contact strips disposed in said housing adjacent an inner side of said lower housing portion, said plurality of said electrical contact strips comprising:
a first contact strip;
a second contact strip in electrical communication with said first contact strip and keyed therewith, said first and second electrical contact strips being insulated from a remainder of said plurality of electrical contact strips; and
a plurality of temrinals positioned adjacent an outer side of said lower housing portion, each terminal comprising strip engaging means extending through said lower housing portion for engaging a contact strip, and for providing electrical communication between said corresponding terminals and contact strips, wherein a treminal is so engaged with said one of said first and second contact strips and each of said remainder of said contact strips.

33. The apparatus of claim 32 wherein said second electrical contact strip is substantially perpendicular to said first electrical contact strip.

34. The apparatus of claim 32 wherein:
one of said first and second contact strips defines an aperture therein; and
the other of said first and second contact strips comprises a key extending therefrom which is engagingly received in said aperture for retaining said first and second contact strips in relatively fixed relationship to said lower housing portion.

35. The apparatus of claim 32 wherein each of said electrical contact strips comprises:
a middle web portion having a wire receiving web opening disposed therethrough, said web portion further including retaining means for engaging a wire when said wire is inserted through said web opening and for resisting withdrawal of said wire from said web opening; and
first and second leg portions extending from said web portion toward said lower housing portion, said leg portions being arranged to engagingly receive said wire and said corresponding strip engaging means therebetween.

36. The apparatus of claim 35 wherein said housing defines a plurality of housing openings disposed through a wall of said housing, each of said housing openings being in registry with a web opening.

37. The apparatus of claim 35 wherein:
said strip engaging means on each of said terminals comprises an electrically conducting member extending through said lower housing portion toward said web portion of the corresponding contact strips; and said first and second leg portions of each of said one contact strip and said remainder of said contact strips being further arranged to engagingly receive said member therebetween at a point respectively longitudinally spaced from said wire.

38. The apparatus of claim 37 wherein each of said one contact strip and said remainder of said contact strips defines a transverse slot therein longitudinally between said member and said wire for compensating for differences in thickness of said member and wire.

39. The apparatus of claim 35 wherein each of said electrical contact strips further comprises a shoulder disposed between said first and second leg portions and adjacent said retaining means for providing an area of electrical contact between said wire and said corresponding electrical contact strip.

40. The apparatus of claim 39 wherein said shoulder is stamped from one of said first and second leg portions and extends substantially perpendicularly therefrom toward the other of said leg portions.

* * * * *

UNITED STATES PATENT AND TRADEMARK OFFICE
CERTIFICATE OF CORRECTION

PATENT NO. : 4,738,634
DATED : April 19, 1988

Page 1 of 2

INVENTOR(S) : Richard D. Taylor and Phillip W. Stumpff

It is certified that error appears in the above-identified patent and that said Letters Patent are hereby corrected as shown below:

On the title page:

Abstract, line 20, delete "strips" and insert --strip-- therefor.

FIG. 3, the lowermost reference numeral 62 and the reference line extending therefrom should be deleted.

FIG. 9, there should be a tapered side wall in upper housing portion 16 to the left of wire 92 similar to that shown in FIG. 3.

Column 4, line 15, delete "line" and insert --lines-- therefor.

Column 5, line 29, after "is", first occurrence, and before "flexible", insert --a--; line 48, after "wire" and before "is" insert --50--.

Column 6, line 9, delete "98, 100 and 102" and insert --102, 100 and 98-- therefor.

Column 9, line 9, delete "distribution" and insert --distinction-- therefor; delete "strip" and insert --strips-- therefor; line 25, delete "not" and insert --no-- therefor; line 61, delete "pres" and insert --press-- therefor.

Column 10, line 29, delete "therefre" and insert --therefore-- therefor; line 50, delete "216" and insert --217-- therefor.

Claim 10, line 6, delete "opting" and insert --opening-- therefor.

Claim 21, line 13, delete "relationshp" and insert --relationship-- therefor.

Claim 26, line 39 delete "23" and insert --25-- therefor.

UNITED STATES PATENT AND TRADEMARK OFFICE
CERTIFICATE OF CORRECTION

PATENT NO. : 4,738,634

DATED : April 19, 1988

INVENTOR(S) : Richard D. Taylor and Phillip W. Stumpff

It is certified that error appears in the above-identified patent and that said Letters Patent are hereby corrected as shown below:

Claim 32, line 28, delete "temrinals" and insert --terminals-- therefor; line 34, delete "treminal" and insert --terminal-- therefor.

Signed and Sealed this

Eighth Day of November, 1988

Attest:

DONALD J. QUIGG

Attesting Officer

Commissioner of Patents and Trademarks